US012448248B2

(12) United States Patent
Bitzi et al.

(10) Patent No.: US 12,448,248 B2
(45) Date of Patent: Oct. 21, 2025

(54) TOP MODULE AND METHOD FOR CLOSING OFF AN ELEVATOR SHAFT OF AN ELEVATOR SYSTEM

(71) Applicant: Inventio AG, Hergiswil (CH)

(72) Inventors: Raphael Bitzi, Lucerne (CH); Bjarne Lindberg, Hellbuhl (CH); Luca Donatz, Chur (CH); Daniel Rohrer, Sarnen (CH); Christian Studer, Kriens (CH)

( * ) Notice: Subject to any disclaimer, the term of this patent is extended or adjusted under 35 U.S.C. 154(b) by 127 days.

(21) Appl. No.: 18/557,977

(22) PCT Filed: May 3, 2022

(86) PCT No.: PCT/EP2022/061743
§ 371 (c)(1),
(2) Date: Oct. 30, 2023

(87) PCT Pub. No.: WO2022/233803
PCT Pub. Date: Nov. 10, 2022

(65) Prior Publication Data

US 2024/0199378 A1 Jun. 20, 2024

(30) Foreign Application Priority Data

May 5, 2021 (EP) .................................... 21172189

(51) Int. Cl.
*B66B 7/02* (2006.01)
*B66B 11/00* (2006.01)
*B66B 19/00* (2006.01)

(52) U.S. Cl.
CPC .......... *B66B 7/025* (2013.01); *B66B 11/0005* (2013.01); *B66B 19/002* (2013.01);
(Continued)

(58) Field of Classification Search
CPC ..... B66B 19/002; B66B 19/005; B66B 7/025; B66B 11/0005; B66B 11/0045
See application file for complete search history.

(56) References Cited

U.S. PATENT DOCUMENTS 4,986,040 A 1/1991 Prewer et al.
5,012,621 A * 5/1991 Power ................. E04B 1/34869 52/745.03
2024/0017965 A1* 1/2024 Bellissimo ............ B66B 5/0087

FOREIGN PATENT DOCUMENTS

CN 106744152 A * 5/2017
CN 208531965 U * 2/2019
(Continued)

OTHER PUBLICATIONS

Machine translation of JP2002087728A, Morigami et al. (Year: 2002).*
Machine translation of JPH082622A (Year: 1996).*

*Primary Examiner* — Minh Truong
*Assistant Examiner* — Michelle M Mudwilder
(74) *Attorney, Agent, or Firm* — Schlee IP International, PC; Alexander R. Schlee; Pascal A. Schlee

(57) ABSTRACT

A top module for closing off an elevator shaft of an elevator system has a first top module side wall and a top module ceiling, a first guide rail piece fixed by a bracket on the first top module side wall, and a drive unit connected to the first guide rail piece. The top module can assume an operating state and a transport state. In the operating state, the first guide rail piece and the drive unit assume operating positions, and a car of the elevator system can be moved in the elevator shaft closed off with the top module. In the transport state, the first guide rail piece and the drive unit assume transport positions that deviate from the operating positions.

15 Claims, 3 Drawing Sheets

(52) U.S. Cl.
CPC ........... *B66B 19/005* (2013.01); *B66B 11/002* (2013.01); *B66B 11/0045* (2013.01)

(56) References Cited

FOREIGN PATENT DOCUMENTS

| | | | | | |
|---|---|---|---|---|---|
| CN | 109399420 | A | * | 3/2019 | ......... B66B 11/0035 |
| DE | 2651566 | A1 | | 5/1978 | |
| DE | 2755267 | A | * | 6/1979 | ............ E04F 17/005 |
| DE | 202014000273 | U1 | * | 5/2014 | ............. B66B 11/00 |
| EP | 1321419 | A1 | | 6/2003 | |
| EP | 1780162 | A1 | * | 5/2007 | ......... B66B 11/0005 |
| EP | 2559647 | A1 | | 2/2013 | |
| EP | 2650248 | A1 | | 10/2013 | |
| JP | H0826622 | A | * | 1/1996 | |
| JP | 2002087728 | A | * | 3/2002 | |
| JP | 3400593 | B2 | * | 4/2003 | |
| JP | 2020023389 | A | | 2/2020 | |
| WO | 2020245373 | A1 | | 12/2020 | |

* cited by examiner

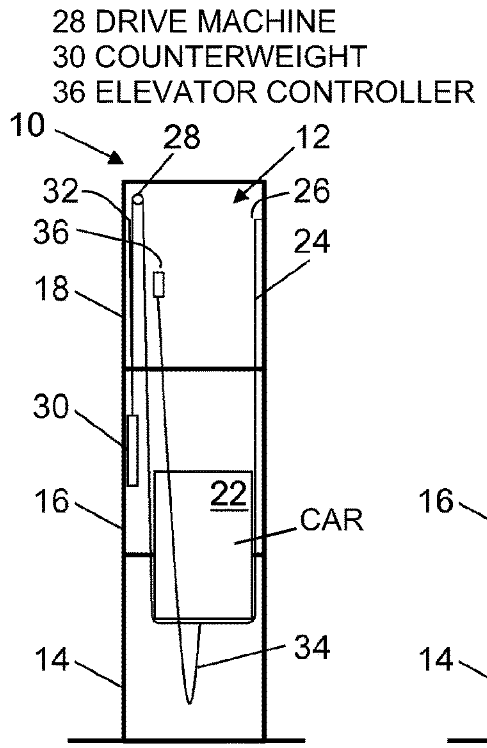
Fig. 1
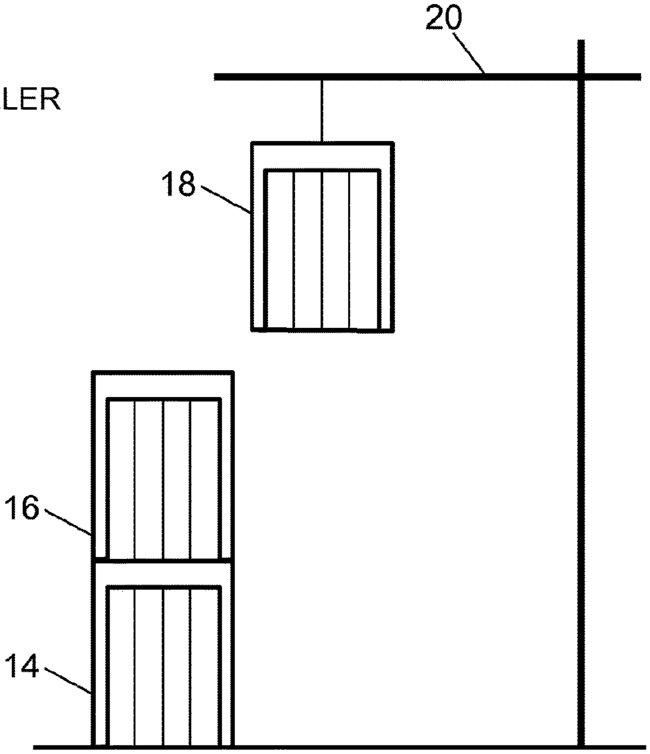
Fig. 2
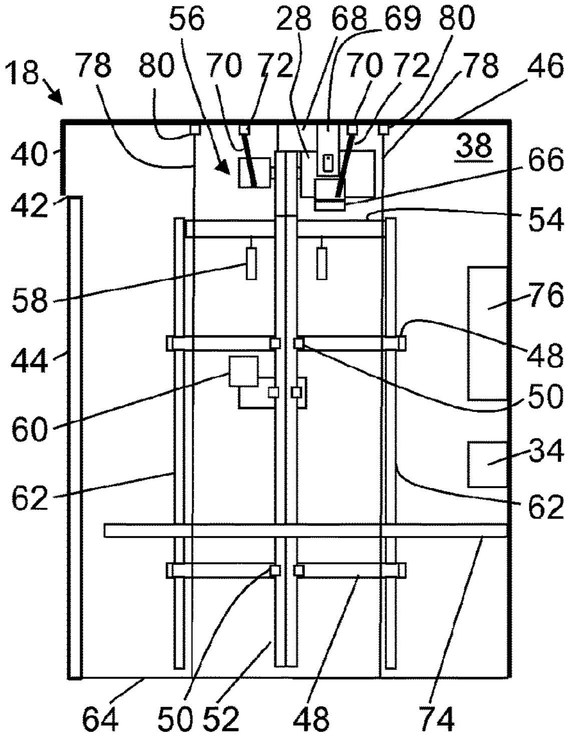
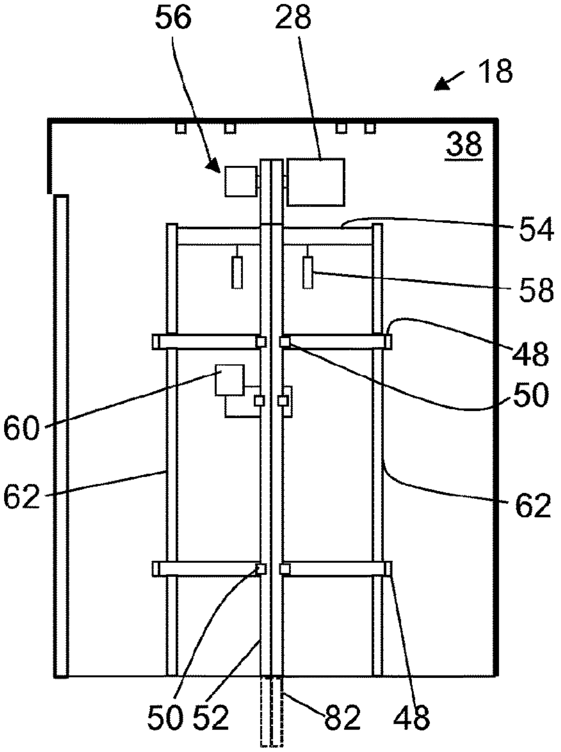
34 TRAVELING CABLE 56 DRIVE UNIT 60 SPEED LIMITER 76 TRANSPORT BOX
Fig. 3
Fig. 4

TOP MODULE AND METHOD FOR CLOSING OFF AN ELEVATOR SHAFT OF AN ELEVATOR SYSTEM

FIELD

The invention relates to a top module for closing off an elevator shaft of an elevator system and to a method for closing off an elevator shaft of an elevator system.

BACKGROUND

The creation of an elevator shaft of an elevator system, for example during the construction of a building, and the subsequent installation of the elevator system, is complex and thus associated with not inconsiderable costs. Usually, the elevator shaft is first created and the elevator system with its components such as the car, counterweight, drive machine and guide rails is subsequently installed in the elevator shaft. It has already been proposed to create the elevator shaft from multiple prefabricated modules in which the necessary components, such as guide rail pieces, are already preassembled. In particular, the prefabrication and preassembly does not take place on the construction site but at a factory. This procedure requires less time at the construction site. In addition, it has positive effects on the quality of the installation and on the working safety of the installation personnel. When assembling the modules, the individual guide rail pieces must be assembled to form continuous guide rails, wherein individual guide rail pieces must touch at their end faces in order to ensure support of the upper guide rail piece by the lower guide rail piece. This is important in particular when the drive machine of the elevator system is arranged in a top module, which closes off the elevator shaft at the top, such that it rests on a guide rail, i.e., that it is at least partially supported by the guide rail.

WO 2020/245373 A1 describes a top module and a method for closing off an elevator shaft of an elevator system. The top module has a first top module side wall and a top module ceiling, a first guide rail piece fixed by means of a bracket on the first top module side wall, and a drive unit connected to the first guide rail piece. WO 2020/245373 A1 does not explain how the aforementioned first guide rail piece can be positioned relative to a guide rail piece arranged underneath, i.e., how it can be placed on it.

SUMMARY

An object of the invention, on the other hand, is in particular to propose a top module and a method for closing off an elevator shaft of an elevator system which enable as extensive as possible preparatory work on the top module and, in particular, a simple installation of the elevator system. According to the invention, this object is achieved by a top module and a method as described herein.

The top module according to the invention for closing off an elevator shaft of an elevator system has a first top module side wall and a top module ceiling, a first guide rail piece fixed by means of a bracket on the first top module side wall, and a drive unit connected to the first guide rail piece. According to the invention, the top module is designed such that it can assume an operating state and a transport state. In the operating state, the first guide rail piece and the drive unit assume operating positions, and a car of the elevator system can be moved in an elevator shaft closed off with the top module. In the transport state, the first guide rail piece and the drive unit assume transport positions that deviate from the operating positions. In the transport position, the first guide rail piece has, in particular, a smaller distance from the top module ceiling than in the operating position. When the top module closes off the elevator shaft, it is thus arranged higher in the transport position than in the operating position. Since the first guide rail piece has an elongate shape, the transport position and the operating position differ in the longitudinal direction of the guide rail piece, which mainly extends vertically during operation of the elevator system. In the transverse direction of the guide rail piece, i.e., mainly horizontally during operation of the elevator system, the transport position does not differ or differs only minimally from the operating position. Small differences in the transverse direction can result when the first guide rail piece is aligned.

The top module according to the invention can thus be built at a factory and brought into the transport state. The first guide rail piece is then fixed by means of at least one bracket on the first top module side wall in the transport position. The drive unit, which comprises at least one drive machine for moving the car of the elevator system, is connected to the first guide rail piece and thus brought into its transport position. The drive unit is in particular connected to the first guide rail piece such that its position relative to one another cannot be changed. In addition, further parts of the elevator system can be mounted on the top module. Subsequently, the top module can be transported to the construction site in the transport state with an elevator shaft that is not yet finished and open at the top. In this elevator shaft, at least one first residual guide rail is mounted onto which the first guide rail piece is placed. The non-finished elevator shaft is composed in particular of multiple prefabricated modules which can also be provided with the necessary components before the top module is placed. It is also possible for the elevator components to be installed in these modules only after the elevator shaft has been assembled. After the top module has been placed, the first guide rail piece and the drive unit can be brought from their transport positions into their operating positions. In its operating position, the first guide rail piece rests on the first residual guide rail piece and is thus supported by the first residual guide rail piece and thus ultimately by a foundation of the elevator shaft. Due to the connection of the first guide rail piece to the drive unit, the drive unit is also supported by the first residual guide rail piece and thus by the foundation.

Due to the existing tolerances or uncertainties during the creation of the not yet completed elevator shaft, it is practically impossible to determine the operating positions of the first guide rail piece and drive unit before the top module is placed, and thus to bring the first guide rail piece and the drive unit into their operating positions already before the top module is placed. Advantageously, the provision of the transport state deviating from the operating state allows for fixing the first guide rail piece and the drive unit on the top module even before it is placed. Thus, as extensive as possible preparatory work can be carried out at the top module. Moreover, since the first guide rail piece and the drive unit only have to be brought from their transport positions into their operating positions after placement, a simple installation of the elevator system is made possible.

The above-mentioned object is also achieved by a method for installing an elevator system, in which an elevator shaft is closed off at the top with a top module. The top module has a first top module side wall and a top module ceiling, a first guide rail piece fixed by means of a bracket on the first top module side wall, and a drive unit connected to the first guide rail piece. To close off the elevator shaft, the top module is placed on top of a yet unfinished part of the elevator shaft. The top module can assume an operating state and a transport state. In the operating state, the first guide rail piece and the drive unit assume operating positions, and a car of the elevator system can be moved in an elevator shaft closed off with the top module. In the transport state, the first guide rail piece and the drive unit assume transport positions that deviate from the operating positions. Before being placed, the top module is first brought into the transport state, and after placement and installation of the guide rail pieces in the subjacent part of the elevator shaft it is brought into the operating state.

Closing off an elevator shaft is to be understood here to mean placing a shaft ceiling onto an elevator shaft the top of which has been open before. In the present case, the shaft ceiling is designed as the top module ceiling of the top module. The top module is thus designed such that it can be placed from above onto an elevator shaft which is not yet finished and which is open at the top, for example with the aid of a crane.

In the operating state of the top module, the top module ceiling extends mainly horizontally and the first top module side wall extends mainly vertically. The top module has, in particular, a cuboidal basic shape with a total of four top module side walls, at least one top module side wall having an opening for a shaft door. The top module can also have a different basic shape, for example with a circular or oval cross section.

The first guide rail piece serves in particular for guiding the car when it moves in the elevator shaft. It can also serve for guiding a counterweight of the elevator system connected to the car via a load suspension means, for example in the form of a cable or band. The elevator system has in particular two guide rails in each case for guiding the car and the counterweight.

In the operating state of the top module, i.e., when the first guide rail piece is in its operating position and rests on the first residual guide rail piece, the first guide rail piece and the first residual guide rail form a guide rail extending over the entire travel path of the car. This enables a displacement of the car in the elevator shaft that is closed off with the top module.

The guide rail pieces are fixed to the side walls with at least one, in particular at least two brackets. The brackets are in particular designed in multiple parts, wherein a first bracket part is fixed, for example screwed, to a side wall, and a second bracket part is connected to the guide rail piece by means of so-called rail clips. The guide rail piece is clamped in particular between the rail clips and the second bracket part. The first and the second bracket parts are screwed together, wherein the orientation of the two bracket parts relative to one another can be changed to align the guide rail piece. Different brackets can be used in this case. For example, so-called Z-brackets, L-brackets or omega brackets can be used. An omega bracket is designed such that a travel path of the counterweight of the elevator system runs between an inner side of the omega bracket and the side wall on which the omega bracket is fixed.

The drive unit has a drive machine, in particular in the form of an electric motor, and in particular a drive holder, via which it is connected, in particular screwed, to the first guide rail piece. The drive unit is thus mainly supported by the first guide rail piece from below. As described above, in the operating state of the top module, the drive unit is thus supported by the associated residual guide rail via the first guide rail piece. The drive unit, in particular the drive holder, can be connected to further elevator components such as, for example, further guide rail pieces for guiding the counterweight.

The transport positions and the operating positions are for example a few centimeters, in particular between 1 and 5 cm, apart, wherein the transport positions and the operating positions of the first guide rail piece and of the drive unit are in particular at the same distance from one another. However, it is also possible for them to have different distances.

The drive unit can be arranged in the top module in particular such that the car can be moved next to or past it. The elevator system can thus be designed as a so-called low-head or no-head elevator. However, the top module can also be designed such that the car can be arranged only below the drive unit.

The top module can be made mainly of wood, concrete, in particular reinforced concrete, or metal. It is not mandatory for the top module to have a door opening.

It is possible for further elevator components to be arranged directly or indirectly on the first guide rail piece, on one of the top module side walls and/or on the top module ceiling in the transport state of the top module. Examples thereof are so-called anchors for fixing the load suspension means of the elevator system, a so-called speed limiter for monitoring the speed of the car, or an elevator controller for controlling the elevator system.

In one embodiment of the invention, one position of the bracket on the first top module side wall in the operating state of the top module is identical to the position of the bracket in the transport state. The position of the first guide rail piece relative to the bracket thus changes when the guide rail piece is brought from the transport position into the operating position.

The position of the bracket(s) on the first top module side wall therefore does not have to be changed when the top module is brought from the transport state into the operating state. The top module can thus be brought particularly easily from the transport state into the operating state, which enables a particularly simple installation of the elevator system. In particular, the positions of all brackets of the top module are identical in the transport state and in the operating state.

In one embodiment of the invention, in the transport state of the top module the drive unit is held by a transport bracket fixed to the first top module side wall and/or the top module ceiling. This enables a particularly secure transport of the top module from the factory, in which it is brought into the transport state, to the construction site. The drive unit bracket is particularly useful because, as already described, the drive unit is supported on the associated residual guide rail in the operating state, which is not possible in the transport state of the top module.

The transport bracket of the drive unit can be designed in a wide variety of ways, in particular, multiple simultaneously used measures are also possible. For example, a holding bracket that is in particular mainly L-shaped can be fastened to the first top module side wall or the top module ceiling such that the drive unit in the transport state of the top module rests on the holding bracket and can optionally be secured with a tension belt. Alternatively or additionally, eyelets can be arranged on the top module ceiling, for example screwed into corresponding openings, on which tension belts for bracing the drive unit relative to the top module ceiling can be fixed. In addition, in the transport state, the top module can have further transport securing means for the drive unit or also for other elevator components. In particular, wooden boards can be fastened or clamped at different locations, which prevent movements of the drive unit and thus damage, for example when hitting the first top module side wall or the top module ceiling.

In one embodiment of the invention, the top module in the transport state has a displacement device for, in particular, common displacement of the drive unit and the first guide rail piece. The drive unit and the first guide rail piece can thus be brought particularly easily from their transport positions into their operating positions. The displacement preferably takes place in the longitudinal direction predetermined by the first guide rail piece, which in the operating state corresponds to the travel direction of the car.

The displacement device can be designed in different ways. To form the displacement device, the drive unit can be suspended from the top module ceiling, for example by means of one or more length-adjustable threaded rods. By increasing the length of the threaded rods, the drive unit can be let down and thus brought from the transport position into the operating position. Alternatively, as described above, it is also possible for the drive unit to rest, in the transport state, on a holding bracket serving as a transport bracket, and for a distance between the drive unit and the holding bracket to be changed, in particular reduced. For this purpose, the drive unit can rest on the holding bracket via one or more length-adjustable threaded rods, for example.

It is also possible for the displacement device not to be part of the top module in the transport state, but to be arranged on the top module or temporarily connected thereto only when it is to be brought from the transport state into the operating state. In this case, the displacement device can, for example, be designed as a chain pull that can be hooked for example into one or more eyelets in the top module ceiling. The eyelets can be the same that are also used for the above-described bracing of the drive unit relative to the top module ceiling. However, additional eyelets can also be provided.

In one embodiment of the invention, the top module in the transport state has an alignment element holder for an alignment element provided and used during the installation of the elevator system. The alignment element can thus be attached in the elevator shaft, for example in the form of a plumb-line, without further effort; in particular the correct position of the alignment element holder does not have to be determined in the elevator shaft by measurements. This allows particularly safe installation of the elevator system. The alignment element holder is arranged in particular on the top module ceiling or drive device. The alignment element holder can, in particular, be designed as an eyelet, angle plate, hook or opening with an internal thread. It is also possible for more than one such alignment element holder to be provided.

The provision of such an alignment element holder can also be regarded as an independent invention which can be realized without a top module with such an alignment element holder having to assume the described transport state and the described operating state.

This would then result in a top module for closing off an elevator shaft of an elevator system, having a first top module side wall and a top module ceiling, wherein the top module has an alignment element holder for an alignment element used when the elevator system is installed. The aforementioned alignment element holder can be removed after the installation of the elevator system.

In one embodiment of the invention, the top module has a second top module side wall opposite the first top module side wall on which a second guide rail piece is fixed by means of at least one bracket. In the operating state, the second guide rail piece assumes an operating position in which the car of the elevator system can be moved in an elevator shaft closed off with the top module. In the transport state, the second guide rail piece assumes a transport position deviating from the operating position.

The statements regarding the first guide rail piece apply accordingly to the second guide rail piece. This embodiment advantageously makes it possible to arrange as many elevator components as possible on the top module in the transport state.

The displacement necessary for setting the operating position starting from the transport position of the second guide rail piece can be identical to, or different from, the displacement of the first guide rail piece and/or drive unit. It is possible for further elevator components to be arranged on the second top module side wall in the transport state. For example, a so-called end lug which denotes a safety switch when a maximum end position of the car is reached can be arranged on the second top module side wall. The further elevator components can be arranged at a corresponding transport position or already at a corresponding operating position.

In one embodiment of the invention, in the transport state of the top module, all guide rail pieces are respectively arranged completely within the top module at a distance from a lower edge of the top module. In other words, no guide rail piece protrudes from the top module. This advantageously reduces the risk of a guide rail piece being damaged during the transport of the top module to the construction site. Moreover, the top module can thus be placed on the yet unfinished part of the elevator shaft without hindrance by projecting guide rail pieces.

In one embodiment of the invention, a traveling cable of the elevator car is arranged within the top module in the transport state of the top module. The car of the elevator system is connected to an elevator controller via the traveling cable during operation so that operation of the elevator system is not possible without a traveling cable. Arranging the traveling cable in the top module enables a particularly simple and effective installation of the elevator system and also allows for as little effort as possible for transporting the necessary elevator components.

The traveling cable can be correctly connected to the elevator controller in the transport state of the top module, which keeps the effort for installation on the construction site low. It is possible for the traveling cable to be fixed on a top module side wall or the top module ceiling with a suitable temporary bracket.

In one embodiment of the invention, a mounting platform extending mainly parallel to the top module ceiling is arranged within the top module in the transport state of the top module. This enables a particularly simple and effective installation of the elevator system. The mounting platform can be used in particular by an installer when displacing the guide rail pieces and the drive unit from their transport positions into their operating positions. In particular temporary holders for the mounting platform can be arranged on the top module side walls.

In one embodiment of the invention, a transport box for accommodating installation material for the elevator system is arranged within the top module in the transport state of the top module. Arranging the transport box in the top module enables a particularly simple and effective installation of the elevator system and also allows for as little effort as possible for transporting the necessary elevator components. The installation material can be designed, for example, as necessary screws, special tools or small parts.

The provision of such a transport box can also be regarded as an independent invention which can be realized without a top module with such a holder having to assume the described transport state and the described operating state. It is also not necessary for the transport box to be arranged in a top module; instead, it can also be arranged in another module of which an elevator shaft is composed.

This would then result in a module of an elevator shaft of an elevator system, wherein a transport box for accommodating installation material for the elevator system is arranged within the top module. The transport box is removed after the installation of the elevator system.

In an embodiment of the method according to the invention, the first guide rail piece and the drive unit are displaced along the first top module side wall in order to displace the first guide rail piece and the drive unit from their transport positions into their operating positions.

The transport brackets holding the drive unit and the transport securing means securing the drive unit are removed before the displacement.

In particular, the first guide rail piece is guided by the associated bracket or the associated guide brackets during the aforementioned displacement of the first guide rail piece and drive unit. This allows particularly safe installation of the elevator system.

In order to enable the displacement of the first guide rail piece and drive unit, the rail clips of the brackets are first released enough to be able to displace the first guide rail piece relative to the bracket. However, the rail clips are in particular not completely removed so that the first guide rail piece is guided during the displacement such that it can move mainly in the vertical direction. A movement in the horizontal direction is prevented by the bracket and the rail clips. The rail clips can be regarded as a part of a bracket.

The procedure is the same when moving further guide rail pieces.

In one embodiment of the method according to the invention, when the first guide rail piece and drive unit are displaced, the drive unit is secured against tilting by an anti-tilt protection. A secure and controlled displacement of the drive unit can thus be ensured.

The drive unit is very heavy and is held in particular below its center of gravity during displacement. This means that there is a risk of the drive unit tilting during displacement, which could result in damage to the drive unit and other components. Tilting is understood here to mean a rotation about a mainly horizontally extending tilting axis. The anti-tilt protection has, for example, an L-bracket fixed to the top module ceiling with an elongated hole extending in the vertical direction. In particular, a threaded rod with a respective nut on each side of the L-bracket, which threaded rod is connected to the drive unit, protrudes from the elongated hole. The aforementioned nuts thus limit a displacement of the threaded rod and thus of the drive unit relative to the L-bracket. The drive unit is thus secured against tilting during the displacement. In this case, the L-bracket and the threaded rod with the nuts form the anti-tilt protection. The anti-tilt protection can also be designed in a different manner deemed expedient by the person skilled in the art.

It is also possible for a corresponding anti-tilt protection to be arranged in the region of the second guide piece and the components connected thereto.

In one embodiment of the method according to the invention, the top module ceiling is installed only after the first guide rail piece and the drive unit have been fixed on the first top module side wall. This makes it possible for the top module to be manufactured in a particularly simple manner. This approach is advantageous in particular if the top module side walls and the top module ceiling are made of wood. In this case, the top module ceiling can be mounted and thus installed on the top module side walls without the risk of damage or excessive pollution of the already installed components.

The exemplary embodiments described relate equally to the top module and method. In other words, features mentioned for example with reference to the top module can also be implemented as method steps, and vice versa. The top module is thus designed in particular such that it can be used in the method described.

The described concept, i.e., that a guide rail piece is arranged on a module of an elevator shaft in an operating position during operation of an elevator system and in a transport position deviating from the operating position during transport can also be applied to shaft modules arranged below the top module in the finished elevator shaft. Such shaft modules can also be referred to as basic modules. The basic modules are thus designed such that they can assume an operating state and a transport state.

The above statements regarding the implementation of the concept in a top module apply accordingly to a basic module.

To create the elevator shaft, two or more basic modules are first placed one on top of the other before the elevator shaft is closed off at the top with a top module. As in the top module, elevator components can be preassembled in the basic modules in particular in a factory before the elevator shaft is created. The basic modules are thus brought into their transport state. Preferably, guide rail pieces for the car and/or the counterweight are preassembled. Here too, the above-described problem arises that the operating position of a guide rail piece cannot be determined in advance (which applies at least for the basic modules above a lowermost basic module). This is why the guide rail pieces are arranged in the basic modules in a transport position which deviates from an operating position. In the transport position, a guide rail piece in a basic module is arranged somewhat higher than in the operating position. In order to bring the guide rail piece from its transport position into the operating position, it is displaced downwards after being placed on the subjacent basic module.

To propose such a basic module can be regarded as an independent invention. This would result in a basic module for an elevator shaft of an elevator system, which has a basic module side wall and a guide rail piece that is fixed to the basic module side wall by means of a bracket. The basic module would be designed such that it can assume an operating state and a transport state, wherein in the operating state, the guide rail piece assumes an operating position and in which a car of the elevator system can be moved in an elevator shaft comprising the basic module, and in the transport state, the guide rail piece assumes a transport position deviating from the operating position.

The approach of arranging a guide rail piece in a basic module thus basically corresponds to the approach of arranging the second guide rail piece on the second top module shaft wall of the top module. The above statements thus also apply accordingly to the basic module.

In the transport state of the basic module, the guide rail piece can, in particular, be fixed to the basic module side wall with a single bracket, which is also used in the operating state of the basic module. In addition, in the transport state of the basic module the guide rail piece can be fixed to the basic module side wall with a further, temporary fixing device, for example by means of a sheet metal bracket or wooden block. This temporary fixing device is removed when the basic module is brought from the transport state into the operating state.

A length of a guide rail piece can correspond to a height of a basic module. In this case, the deviations between the transport position and the operating position of the guide rail pieces of the individual basic modules are in particular different. The difference increases, in particular, the further above a basic module is to be arranged in the elevator shaft. This advantageously allows for placing the basic modules on top of one another in the transport state in order to create the elevator shaft, without the guide rail pieces abutting against one another.

A length of a guide rail piece can also be less than the height of a basic module. In this case, the guide rail pieces are also displaced downwards to reach their respective transport position. The higher a basic module is arranged in the elevator shaft, the further must the corresponding guide rail piece be displaced therewith. After displacing the guide rail pieces of the basic modules and of the top module, a further guide rail piece is then inserted in particular above the displaced guide rail piece of the top module. This further guide rail piece was previously not arranged in the top module or at least not in an extension of the individual guide rail pieces of the top module in its transport positions.

Further advantages, features and details of the invention can be found in the following description of embodiments and with reference to the drawings, in which like or functionally like elements are provided with identical reference signs. The drawings are merely schematic and are not to scale.

DESCRIPTION OF THE DRAWINGS

In the figures:

FIG. 1 shows an elevator system with a car in an elevator shaft composed of three modules;

FIG. 2 shows a snapshot when a top module is placed on a yet unfinished elevator shaft of an elevator system;

FIG. 3 shows a first top module side wall of a top module in a transport state;

FIG. 4 shows the first top module side wall from FIG. 3 of the top module in an operating state;

DETAILED DESCRIPTION

Figure 5:
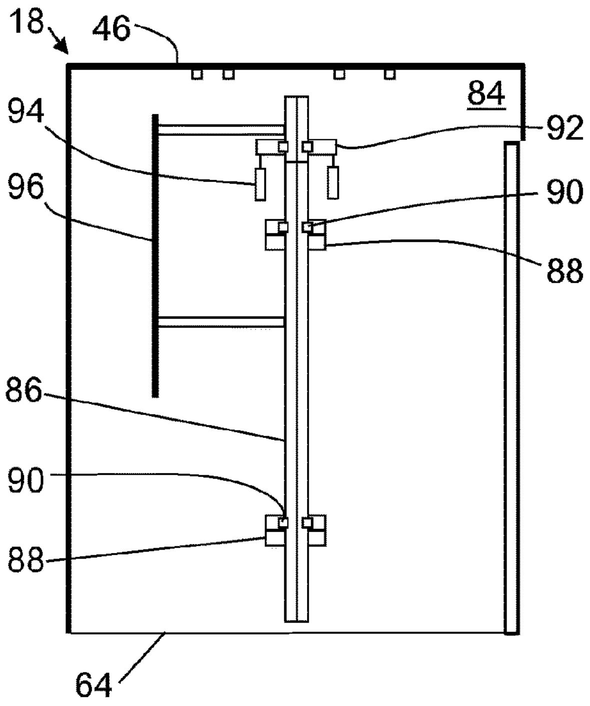
FIG. 5 shows a second top module side wall of a top module in the transport state.

According to FIG. 1, an elevator system 10 has an elevator shaft 12 for a three-story building, which in the present exemplary embodiment is composed of a first basic module 14, a second basic module 16 and a top module 18. The elevator shaft 12 can comprise further second basic modules 16 depending on the number of floors. The shaft modules 14, 16, 18 are pre-produced in a factory and provided with elevator components. Subsequently, they are brought to the construction site and put on top of one another.

FIG. 2 shows how the top module 18 is placed on the second basic module 16 from above by means of a crane 20. The second basic module 16 was previously placed in the same way onto the first basic module 14. The basic module 14 stands on a foundation (not shown) of the elevator shaft 12. The basic modules 14, 16 form an elevator shaft which is open at the top and has not yet been completed and which is closed off at the top by placing the top module 18 on it.

Moreover, the elevator system 10 of FIG. 1 has a car 22 which can be moved vertically in the elevator shaft 12 along guide rails (see 52 in FIG. 3) which are not shown in FIG. 1. For this purpose, the elevator system 10 has a load suspension means 24, the first end 26 of which is fixed in the top module 18. It then runs around the car 22 at the bottom and is guided via a drive machine 28 arranged in the top module 18 opposite the first end 26 of the load suspension means 24. From there, it runs through a suspension of a counterweight 30 to its second end 32, which is fixed in the region of the drive machine 28. The drive machine 28 can move the load suspension means 24 and thus the car 22 in the elevator shaft 12. The car 22 is connected to an elevator controller 36 arranged in the top module 18 via a traveling cable 34. The traveling cable 34 enables a power supply and a communication with the car 22.

The top module 18, which consists, for example, mainly of wood, has a total of four top module side walls assembled such as to form a cuboid basic shape. FIGS. 3 and 4 show a view of a first top module side wall 38. FIG. 3 shows the first top module side wall 38 in a transport state, and FIG. 4 shows the first top module side wall 38 in an operating state of the top module 18. The top module 18 is created in a factory and brought into the transport state in which it is transported to the construction site and, as shown in FIG. 2, placed on an elevator shaft which is open at the top and has not yet been completed. In the course of the further installation of the elevator system 10, the top module 18, among other things, is brought into the operating state in which the elevator system 10 is operated, i.e., in which the car 22 can be moved in the elevator shaft 12. This is exemplified in FIG. 1.

As shown in FIGS. 3 and 4, the first top module side wall 38 adjoins, on its left side, a third top module side wall 40 that has an opening 42. The opening 42 is closed with a shaft door 44 that is also used during later operation of the elevator system 10. The first top module side wall 38 adjoins a top module ceiling 46 at the top, which top module ceiling 46 closes off the top module 18 and thus the elevator shaft 12 at the top.

A first guide rail piece 52 is fixed to the first top module side wall 38 by means of two brackets in the form of omega brackets 48 and rail clips 50 on the first top module side wall 38. Fixing by means of the rail clips 50 will be described in more detail in connection with FIG. 7. The omega brackets 48 are screwed to the first top module side wall 38 by screws (not shown). The omega brackets 48 are designed such that a travel path of the counterweight 30 runs between an inner side of the omega brackets 48 and the first top module side wall 38. During operation of the elevator system 10, the first guide rail piece 52 serves to guide the car 22 when the latter moves in the elevator shaft 12. The first guide rail piece 52 is designed, in particular, in two parts.

The first guide rail piece 52 is connected in the upper region to a drive holder 54 of a drive unit 56 by means of a screw connection (not shown). The drive holder 54 has a mainly elongated shape extending horizontally along the first top module side wall 38. The drive holder 54 supports the drive 28. Moreover, two anchors 58 on which the second end 32 of the load suspension means 24 can be fixed are arranged on the drive holder 54 (see FIG. 1). In addition, a speed limiter 60 is arranged on the first guide rail piece 52 between the two omega brackets 48.

Third guide rail pieces 62 are fixed to the parts of the omega brackets 48, which project away from the first top module side wall 38, by means of rail clips (not shown). During operation of the elevator system 10, the third guide rail pieces 62 serve to guide the counterweight 30 during movement in the elevator shaft 12. The third guide rail pieces 62 are connected to the drive holder 54 via a screw connection (not shown). It is possible for the third guide rail pieces to be fixed to the first top module side wall by means of a respective further bracket arranged between the upper omega bracket and the drive holder.

According to FIG. 3, in the transport state of the top module 18, the first guide rail piece 52 and the drive unit 56 assume their transport positions or are arranged in their transport positions on the first top module side wall 38. In its transport position, the first guide rail piece 52 ends, like the two third guide rail pieces 62, at a distance from a lower edge 64 of the top module 18. Compared to FIG. 4, in which the first guide rail piece 52 and the drive unit 56 assume their operating positions in the operating state of the top module 18, the first guide rail piece 52 and the two third guide rail pieces 62 are arranged a few centimeters higher in their transport positions, i.e., in the direction of the top module ceiling 46. The drive unit 56 which is immovably connected to the first guide rail piece 52 is thus arranged in its transport position higher by the same distance than in its operating position.

In addition, in the transport state of the top module 18 according to FIG. 3, a transport bracket in the form of a holding bracket 66 is screwed to the first top module side wall 38 below the drive machine 28 such that the drive machine rests on the holding bracket 66. In addition, a wooden board 68 is arranged between the drive machine 28 and the top module ceiling 46, against which the drive machine 28 is pressed by means of two tension belts 70. The tension belts 70 are guided below the drive machine 28 and are fastened to the top module ceiling 46 by means of one eyelet 72 in each case. Furthermore, further wooden boards (not shown) can be used as transport securing means.

Moreover, an anti-tilt protection 69 is fastened to the top module ceiling 46. The anti-tilt protection 69 has an L-bracket screwed to the top module ceiling 46 with an elongated hole extending in the vertical direction. A threaded rod with a respective nut on each side of the L-bracket, which threaded rod is connected to the drive machine 28, protrudes from the elongated hole. The aforementioned nuts thus limit a displacement of the threaded rod and thus of the drive machine 28 relative to the L-bracket. In this case, the L-bracket and the threaded rod with the nuts form the anti-tilt protection 69.

Moreover, in the transport state of the top module 18 according to FIG. 3, a mounting platform 74 extending parallel to the top module ceiling 46 is arranged in the top module 18. The mounting platform 74 is fastened to the top module side walls by means of fixings (not shown). The mounting platform can be used by an installer when installing the elevator system 10. In addition, a transport box 76 for accommodating installation material and the traveling cable 34 are arranged on the first top module side wall 38 by means of fixings (not shown).

During production of the top module 18, the top module ceiling 46 is installed, in particular, only after the first guide rail piece 52 and the drive unit 56 have been fixed on the first top module side wall 38.

In order to enable alignment of the individual guide rails or individual guide rail pieces during the further installation of the elevator system 10, two alignment elements in the form of plumb-lines 78 are fixed on alignment element holders provided for this purpose in the form of eyelets 80 on the top module ceiling 46. The plumb-lines 78 can also be fixed only once the top module 18 has been placed on the second basic module 16.

In order to bring the top module 18 from the transport state into the operating state once it has been placed on the second basic module 16, i.e., from the state shown in FIG. 3 into the state shown in FIG. 4, two chain pulls (not shown) are arranged parallel to the tension belts 70 such that, after the removal of the tension belts 70, the drive machine 28 and thus all components connected thereto remain in their respective transport position. The holding bracket 66 and any further transport securing means are then removed. Then, all rail clips 50 holding the guide rail pieces 52, 62 are released enough to be able to displace the guide rail pieces 52, 62 vertically downwards relative to the omega brackets 48. By releasing by means of the chain pulls, the drive machine 28, and thus the drive unit 56, the first guide rail piece 52, the anchors 58, the two third guide rail pieces 62, and the speed limiter 60 are displaced slowly along the first top module side wall 38 downwards in the direction of the lower edge 64 of the top module 18. Since the rail clips 50 are not removed but only released, the first bracket piece 52 and the two third guide rail pieces 62 are guided, during this displacement, by the associated brackets in the form of the omega brackets 48. The positions of the brackets in the form of the omega brackets 48 on the first top module side wall 38 remain unchanged. During the displacement, the anti-tilt protection 69 prevents the drive machine 28 from tilting.

The displacement is continued until the first guide rail piece 52 comes to rest on a first residual guide rail piece 82 shown in dashed lines in FIG. 4 and is thus supported on it. The first guide rail piece 52 is in particular connected to the residual guide rail piece 82. This applies in particular to all guide rail pieces and associated residual guide rail pieces of the elevator system 10. The first residual guide rail piece 82 runs through the second basic module 16 and the first basic module 14. The two chain pulls can then be removed and the first guide rail piece 52 can be fixed by tightening the rail clips 50.

Figure 6:
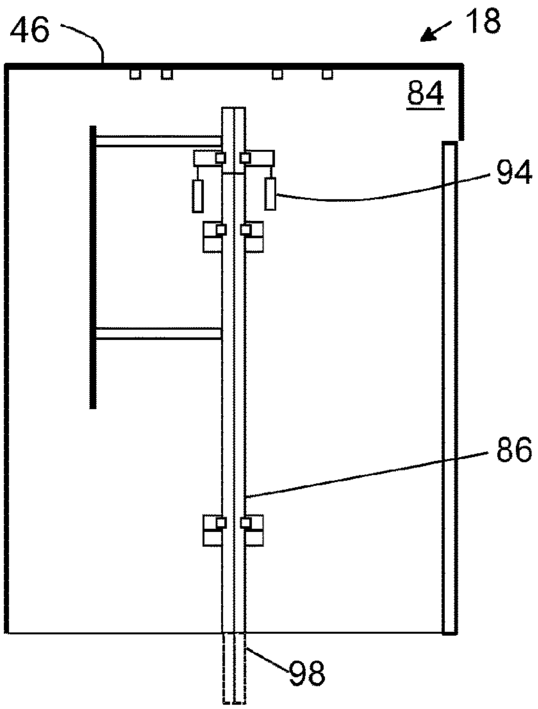
FIG. 6 shows the second top module side wall from FIG. 5 of the top module in the operating state.

According to FIGS. 5 and 6, elevator components, which assume transport positions in the transport state of the top module 18 (see FIG. 5) and operating positions in the operating state (see FIG. 6), are arranged not only on the first top module side wall 38, but also on an opposite second top module side wall 84. One of the aforementioned elevator components is a second guide rail piece 86, which is the counterpart to the first guide rail piece 52 for guiding the car 22 during movement in the elevator shaft 12. The second guide rail piece 86 is fixed to the second top module side wall 84 by means of two brackets in the form of Z-brackets 88 and rail clips 90. Two anchors 94, on which the first end 26 of the load suspension means 24 (see FIG. 1) can be fixed, are arranged in the upper region of the second guide rail piece 86 via a holder 92. In addition, an end lug 96 extending parallel to the second guide rail piece 86 is fastened to the second guide rail piece 86, which end lug 96 denotes a safety switch when a maximum end position of the car 22 is reached.

According to FIG. 5, in the transport state of the top module 18, the second guide rail piece 86 assumes its transport position or is arranged in its transport position on the second top module side wall 84. In the transport position of the second guide rail piece 86, the latter ends at a distance from the lower edge 64 of the top module 18. Compared to FIG. 6, in which the second guide rail piece 86 assumes its operating position in the operating state of the top module 18, the second guide rail piece 86 is arranged a few centimeters higher in its transport position, i.e., in the direction of the top module ceiling 46. The same applies to anchors 94 and end lug 96.

It is also possible for an anti-tilt protection corresponding to the anti-tilt protection 69 shown in FIG. 3 to be arranged in the region of the second guide rail piece and the components connected thereto.

In order to bring the second guide rail piece 86 from its transport position into its operating position once it has been placed on the second basic module 16, the rail clips 90 of the Z-brackets 88 are released enough to be able to displace the second guide rail piece 86 together with the anchors 94 and the end lug 96 downwards relative to the Z-brackets 88. No chain pull is necessary for this purpose, since in this case the components to be displaced do not have as great a weight. The second guide rail piece 86 is thus displaced along the second top module side wall 84 downwards in the direction of the lower edge 64 of the top module 18 and guided by the two Z-brackets 88. The positions of the brackets in the form of the Z-brackets 88 on the second top module side wall 84 remain unchanged.

The displacement is continued until the second guide rail piece 86 comes to rest on a second residual guide rail piece 98 shown in dashed lines in FIG. 6 and is thus supported on it. The second guide rail piece 86 can then be fixed by tightening the rail clips 90.

The mounting platform 74, the transport box 76 and the traveling cable 34 are removed from the top module 18 during installation of the elevator system 10.

Figure 7:
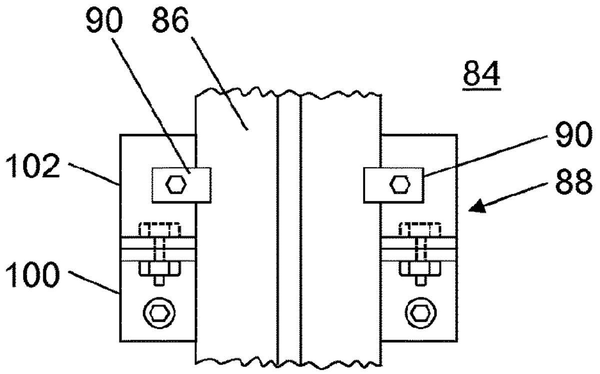
FIG. 7 shows a bracket with a detail of a guide rail.

The described release of rail clips 90 for enabling a displacement of the second guide rail piece 86 relative to the Z-bracket 88 is described in more detail with reference to the illustration of a bracket in the form of a Z-bracket 88 in FIG. 7. The Z-bracket 88 has a lower, L-shaped bracket part 100 which is screwed to the second top module shaft wall 84. An upper, also L-shaped bracket part 102 rests on the lower bracket part 100, wherein the two bracket parts 100, 102 are screwed together. The two bracket parts 100, 102 can be displaced relative to one another within certain limits to thus align the second guide rail piece 86. Two rail clips 90 are screwed on the upper bracket part 102 such as to press the second guide rail piece 86 against the upper bracket part 102 and thus clamp it. To fix the second guide rail piece 86 to the Z-bracket, the rail clips 90 are tightened such that no relative movement between the second guide rail piece 86 and the Z-bracket 88 is possible. In order to enable a displacement of the second guide rail piece 86 along the second top module side wall 84, the rail clips 90 are released enough to enable a relative movement between the second guide rail piece 86 and the Z-bracket 88. However, the rail clips 90 are not removed, so that the second guide rail piece 86 is guided by the Z-bracket 88 and the rail clips 90 during displacement. The rail clips 90 can be regarded as part of the Z-bracket.

It has been described in connection with FIGS. 1 and 2 that chain pulls are used during displacement of the first guide rail part and drive unit. It is also possible for the top module 18 to have, at least in the transport state, a displacement device for displacing the drive unit and the first guide rail piece.

Figure 8:
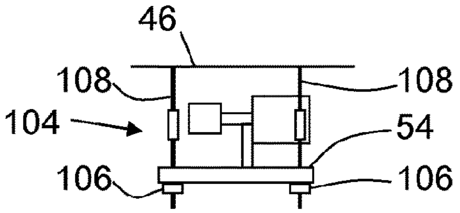
FIG. 8 shows a first variant of a displacement device for displacing a drive unit of the elevator system.

According to FIG. 8, a first variant of such a displacement device 104 has two holding brackets 106 on which the drive holder 54 rests. The holding brackets 106 are each fastened to the top module ceiling 46 with two length-adjustable threaded rods 108. By increasing the length of the threaded rods 108, the drive holder 54 and all components connected thereto, i.e., also the first guide rail piece 52 not shown with the drive holder 54 and in FIG. 8, can be displaced downwards.

Figure 9:
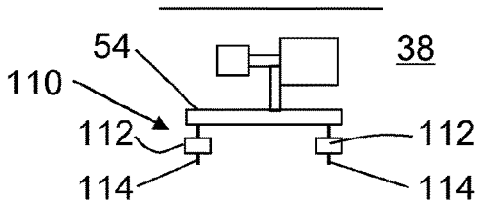
FIG. 9 shows a second variant of a displacement device for displacing a drive unit of the elevator system.

According to FIG. 9, a second variant of such a displacement device 110 has two holding brackets 112 which are fixed to the first top module side wall 38. A threaded rod 114, on which the drive holder 54 rests, runs through each of the two holding brackets 112. By turning the threaded rods 114 downwards, the drive holder 54 and all components connected thereto can be displaced downwards. It is also possible to use a total of four threaded rods and/or for supports to be arranged between the threaded rods and the drive holder.

Figure 10:
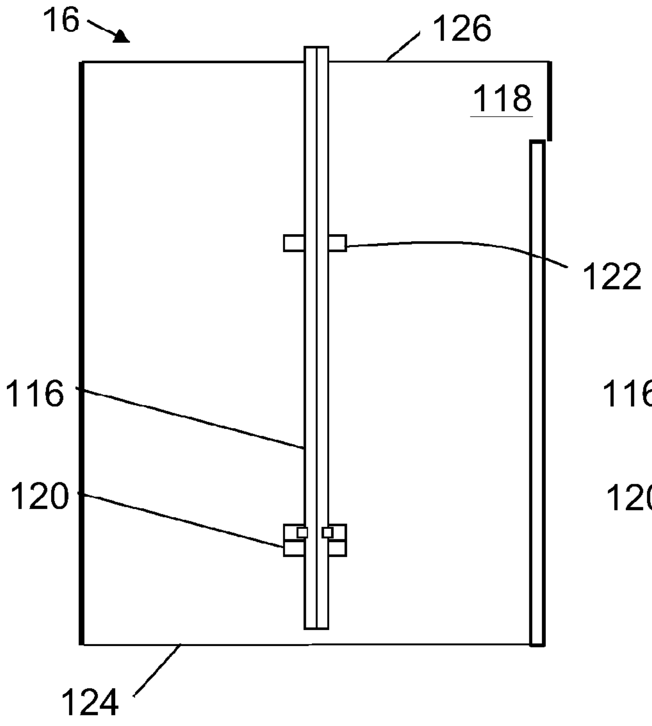
FIG. 10 shows a basic module side wall of a basic module in the transport state.
Figure 11:
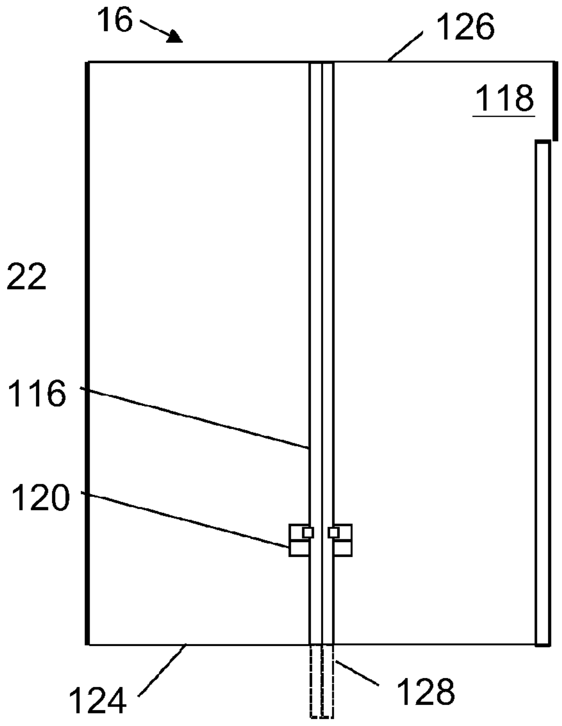
FIG. 11 shows the basic module side wall from FIG. 10 in the operating state of the basic module.

According to FIGS. 10 and 11, a fourth guide rail piece 116 is arranged also on the second basic module 16, which guide rail piece 116 assumes a transport position (see FIG. 10) in the transport state of the basic module 16 and an operating position (see FIG. 11) in the operating state. According to FIG. 10, the fourth guide rail piece 116 is fixed to a basic module side wall 118 in the transport state of the basic module 16 by means of a bracket 120 and is fixed to the basic module side wall 118 by means of a temporary fixing device in the form of a sheet metal bracket 122 in a transport position. In the transport position of the fourth guide rail piece 116, the latter has a distance from a lower edge 124 of the basic module. Since the fourth guide rail piece 116 has a length which corresponds to the height of the second basic module 16, the fourth guide rail piece 116 projects beyond an upper edge 126 of the second basic module 16.

In order to bring the fourth guide rail piece 116 from its transport position into its operating position shown in FIG. 11 after having been placed on the first basic module 14, the sheet metal bracket 122 is first removed. Subsequently, rail clips of the bracket 120 are released enough to be able to displace the fourth guide rail piece 116 downwards.

The displacement is continued until the fourth guide rail piece 116 comes to rest on a fourth residual guide rail piece 128 shown in dashed lines in FIG. 11 and is thus supported on it. The fourth guide rail piece 116 can then be fixed by tightening the rail clips of the bracket 120.

The second basic module 16 has a further, accordingly arranged guide rail piece in particular on a side wall opposite the mentioned side wall. The different basic modules of an elevator shaft are in particular basically of the same design.

In the various basic modules of an elevator shaft, the deviations between the transport position and the operating position of the guide rail pieces of the individual basic modules are in particular different. The difference increases, in particular, the further above a basic module is arranged in the elevator shaft.

The length of the fourth guide rail piece can also be less than the height of the second basic module. In this case, the fourth guide rail piece is also displaced downwards to reach its transport position. After displacing the guide rail pieces of all basic modules and of the top module, a further guide rail piece is then inserted in particular above the displaced guide rail piece of the top module. This further guide rail piece was in particular not arranged in the top module before. This further guide rail piece can be, for example, the upper part of the two-part first guide rail piece.

Finally, it should be noted that terms such as "having," "comprising," etc. do not preclude other elements or steps, and terms such as "a" or "an" do not preclude a plurality. Furthermore, it should be noted that features or steps which have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A top module for closing off an elevator shaft of an elevator system, the top module comprising:

a first top module side wall adjoining a top module ceiling;

a first guide rail piece fixed to the first top module side wall by a bracket;

a drive unit connected to the first guide rail piece;

wherein the top module is adapted to be in a transport state prior to placement on the elevator shaft and is adapted to be in an operating state after being placed on the elevator shaft;

when the top module is in the operating state, the first guide rail piece and the drive unit are in operating positions and in which a car of the elevator system is moved in the elevator shaft that is closed off with the top module; and when the top module is in the transport state, the first guide rail piece and the drive unit are in transport positions that deviate from the operating positions; and wherein the drive unit is immovably connected to the first guide rail piece in both the operating state and the transport state.

2. The top module according to claim 1 a position of the bracket on the first top module side wall when the top module is in the operating state is identical to a position of the bracket on the first top module side wall when the top module is in the transport state.

3. The top module according to claim 1 wherein, in the transport state of the top module, the drive unit is held by a holding bracket fixed to the top module.

4. The top module according to claim 1 wherein the top module when in the transport state includes a displacement device for displacing the drive unit and the first guide rail piece relative to the first top module side wall.

5. The top module according to claim 1 wherein the top module when in the transport state includes an alignment element holder adapted to hold an alignment element during an installation of the elevator system.

6. The top module according to claim 1 including a second top module side wall opposite the first top module side wall and a second guide rail piece fixed to the second top module side wall by another bracket, wherein when the top module is in the operating state, the second guide rail piece is in an operating position and the car of the elevator system is moved in the elevator shaft that is closed off with the top module, and when the top module is in the transport state, the second guide rail piece is in a transport position deviating from the operating position of the second guide rail piece.

7. The top module according to claim 6 wherein when the top module is in the transport state, the first and second guide rail pieces are arranged completely within the top module and spaced from a lower edge of the top module.

8. The top module according to claim 1 wherein when the top module is in the transport state, a traveling cable of the car is arranged within the top module.

9. The top module according to claim 1 wherein when the top module is in the transport state, a mounting platform extending parallel to the top module ceiling is arranged within the top module.

10. The top module according to claim 1 wherein when the top module is in the transport state, a transport box accommodating installation material for the elevator system is arranged within the top module.

11. A method for installing an elevator system having an elevator shaft to be closed off at a top with a top module, the method comprising the following steps:

providing the top module having a first top module side wall adjoining a top module ceiling, a first guide rail piece fixed to the first top module side wall by a bracket, and a drive unit connected to the first guide rail piece;

wherein the top module is adapted to assume an operating state in which the first guide rail piece and the drive unit are in operating positions and a car of the elevator system can be moved in the elevator shaft closed off with the top module, sAs the top module is adapted to assume a transport state in which the first guide rail piece and the drive unit are in transport positions that deviate from the operating positions, and the drive unit and the first guide rail piece remain immovably connected in both the operating state and the transport state;

bringing the top module into the transport state before placement on the elevator shaft;

placing the top module on top of an unfinished part of the elevator shaft to close off the elevator shaft; and bringing the top module into the operating state after the placement on the elevator shaft.

12. The method according to claim 11 including displacing the first guide rail piece and the drive unit from the transport positions along the first top module side wall into the operating positions to bring the top module into the operating state.

13. The method according to claim 12 including during the displacement guiding the first guide rail piece by the bracket.

14. The method according to claim 12 including during the displacement securing the drive unit against tilting by an anti-tilt protection.

15. The method according to claim 11 including installing the top module ceiling after the first guide rail piece and the drive unit have been fixed on the first top module side wall.

* * * * *